(12) United States Patent
Ijiri et al.

(10) Patent No.: US 8,351,670 B2
(45) Date of Patent: Jan. 8, 2013

(54) REGION DATA EDITING APPARATUS, REGION DATA EDITING METHOD, AND RECORDING MEDIUM

(75) Inventors: Takashi Ijiri, Wako (JP); Hideo Yokota, Wako (JP)

(73) Assignee: Riken, Wako-shi (JP)

( * ) Notice: Subject to any disclaimer, the term of this patent is extended or adjusted under 35 U.S.C. 154(b) by 220 days.

(21) Appl. No.: 13/018,892

(22) Filed: Feb. 1, 2011

(65) Prior Publication Data

US 2012/0002850 A1 Jan. 5, 2012

(30) Foreign Application Priority Data

Jun. 30, 2010 (JP) ................................. 2010-149462

(51) Int. Cl.
*G06K 9/00* (2006.01)
*G06T 17/00* (2006.01)
(52) U.S. Cl. .......................... 382/128; 382/199; 345/424
(58) Field of Classification Search .................. 382/100, 382/103, 106–107, 128, 129, 130, 132, 133, 382/134, 154, 155, 162, 168, 173, 181, 198–199, 382/232, 254, 256, 266, 274, 276, 305, 312; 345/424, 420; 716/117; 378/4, 21
See application file for complete search history.

(56) References Cited

U.S. PATENT DOCUMENTS

| | | | | |
|---|---|---|---|---|
| 6,301,694 | B1* | 10/2001 | Lee et al. ....................... | 716/117 |
| 7,893,939 | B2* | 2/2011 | Geiger et al. .................. | 345/424 |
| 2008/0170768 | A1* | 7/2008 | Matsumoto .................... | 382/128 |
| 2008/0225044 | A1* | 9/2008 | Huang et al. .................. | 345/420 |

FOREIGN PATENT DOCUMENTS

| | | |
|---|---|---|
| JP | 7-037107 | 2/1995 |
| JP | 2008-173167 | 7/2008 |

OTHER PUBLICATIONS

"Volume Segmentation Method Using mGraph Cut and Fiber Mesh" by T. Ijiri, et al., 23rd Regular Research Meeting on Feb. 5, 2010, NPO Corporation VCAD System Study Group.
"Sketch-Based Interface for Volume Image Segmentation" by T. Ijiri, et al., (Bio-research infrastructure construction team, RIKEN), The 4th Symposium on Volume-CAD System Research Program, Mar. 1, 2010, published by VCAD System Research Program.
"Contour-Based Interface for Refining Volume Segmentation" by T. Ijiri, et al., vol. 29, (2010), No. 7, Special Issue Hangzhou, China, Guest Editors: P. Alliez, et al., ISSN 0167-7055. Pacific Graphics 2010.

* cited by examiner

*Primary Examiner* — Seyed Azarian
(74) *Attorney, Agent, or Firm* — Brundidge & Stanger, P.C.

(57) ABSTRACT

A region data editing apparatus includes a contour deforming section for receiving a contour deforming operation in which a contour of a region in a three-dimensional image is deformed, a boundary surface deforming section for deforming a boundary surface ∂D between inside and outside of region D in such a manner that the boundary surface ∂D follows the contour deformed by the contour deforming operation, and a region data updating section for updating region data in such a manner that the region data thus updated represents an inside of the boundary surface which has been deformed by the boundary surface deforming section.

10 Claims, 8 Drawing Sheets

REGION DATA EDITING APPARATUS, REGION DATA EDITING METHOD, AND RECORDING MEDIUM

This Nonprovisional application claims priority under 35 U.S.C. §119(a) on Patent Application No. 2010-149462 filed in Japan on Jun. 30, 2010, the entire contents of which are hereby incorporated by reference.

TECHNICAL FIELD

The present invention relates to a region data editing apparatus and a region data editing method in each of which region data which represents a region extracted from a three-dimensional image is edited. The present invention also relates to a computer-readable recording medium in which a program for causing a computer to operate as such a region data editing apparatus is recorded.

BACKGROUND ART

In order to extract, from a three-dimensional image captured by CT (Computed Tomography), MRI (Magnetic Resonance Imaging), a confocal laser microscopy, or the like, various pieces of information (a shape, a volume, a topology, etc.) concerning an object to be observed such as an organ or a bone structure, it is necessary to extract, from the three-dimensional image, a region which corresponds to the object to be observed. Against a backdrop of this, various methods for automatically extracting, from an image, a region which corresponds to an object to be observed have been developed. However, a region automatically extracted from an image does not necessarily accurately represent a shape of an object to be observed. This requires correcting a region automatically extracted from an image while visually inspecting the image, so as to approximate, with high accuracy, a shape of an object to be observed.

Examples of a method for supporting such a correction include a contour correcting method described in Patent Literature 1 and a region correcting method described in Patent Literature 2. The contour correcting method described in Patent Literature 1 is directed to edit, by simple operation, a contour generated from a two-dimensional image by auto tracing. The region correcting method described in Patent Literature 2 is directed to simply and easily correct, by use of a guide region, a missing part or the like of a region extracted from a three-dimensional image.

CITATION LIST

Patent Literature 1
Japanese Patent Application Publication, Tokukaihei, No. 7-37107 A (Publication Date: Feb. 7, 1995)
Patent Literature 2
Japanese Patent Application Publication, Tokukai, No. 2008-173167 A (Publication Date: Jul. 31, 2008)

SUMMARY OF INVENTION

Technical Problem

However, even in accordance with the methods described in Patent Literatures 1 and 2, it has been extremely difficult to efficiently edit a region extracted from a three-dimensional image, so as to prevent a decrease in extraction accuracy. Note here that the extraction accuracy refers to an accuracy at which an extracted region approximates a shape of an object to be observed.

For example, in a case where the method described in Patent Literature 1 is applied to a correction of a three-dimensional region, the method is applied to each of two-dimensional planar cross sections which constitute a three-dimensional image. Therefore, an increase in workload in proportion to the number of two-dimensional planar cross sections is inevitable even if a contour of each of the two-dimensional planar cross sections is easily corrected. In contrast, assume that in order to reduce a workload, the number of two-dimensional planar cross sections to be corrected is decreased. This causes a deterioration in extraction accuracy. Note that the method described in Patent Literature 2, which is an effective technique only in a case a suitable guide region exists, is extremely limited in scope of application.

The present invention has been made in view of the problem, and an object of the present invention is to realize a method and an apparatus each of which is capable of efficiently editing region data which represents a region extracted from a three-dimensional image, so as to prevent a decrease in extraction accuracy.

Solution to Problem

In order to attain the object, a region data editing apparatus according to the present invention includes: a data obtaining section for obtaining region data which represents a region of a three-dimensional space which region has been extracted from a three-dimensional image; a specifying operation receiving section for receiving a cross section specifying operation in which a cross section of the three-dimensional image is specified; a deforming operation receiving section for receiving a contour deforming operation in which a contour of the region on the cross section which has been specified by the cross section specifying operation is deformed; a boundary surface deforming section for deforming a boundary surface between inside and outside of the region in such a manner that the boundary surface follows the contour deformed by the contour deforming operation; and a region data updating section for updating the region data in such a manner that the region data thus updated represents an inside of the boundary surface which has been deformed by the boundary surface deforming section.

According to the arrangement, in response to the contour deforming operation carried out by a user with respect to the contour of the region on the specified cross section, the region data editing apparatus deforms the boundary surface between inside and outside of the region in such a manner that the boundary surface follows the contour deformed by the contour deforming operation. Namely, in response to the contour deforming operation carried out by a user with respect to the contour on the specified cross section, the region data editing apparatus deforms a contour of another cross section (a cross section other than the specified cross section). Then, the region data editing apparatus updates the region data in such a manner that the region data thus updated represents an inside of the boundary surface which has been deformed. This allows the user to deform fewer contours so as to obtain a desired extraction accuracy. Namely, it is possible to efficiently edit the region data so as to prevent a decrease in extraction accuracy.

In order to attain the object, a region data editing method according to the present invention includes the steps of: (a) obtaining region data which represents a region of a three-dimensional space which region has been extracted from a three-dimensional image; (b) receiving a cross section specifying operation in which a cross section of the three-dimensional image is specified; (c) receiving a contour deforming operation in which a contour of the region on the cross section which has been specified by the cross section specifying operation is deformed; (d) deforming a boundary surface between inside and outside of the region in such a manner that the boundary surface follows the contour deformed by the contour deforming operation; and (e) updating the region data in such a manner that the region data thus updated represents an inside of the boundary surface which has been deformed in the step (d).

The arrangement yields an effect similar to that yielded by the region data editing apparatus.

Advantageous Effects of Invention

The present invention yields an effect of efficiently editing region data which represents a region of a three-dimensional space which region has been extracted from a three-dimensional image, so as to prevent a decrease in extraction accuracy.

DESCRIPTION OF EMBODIMENTS

An embodiment of the present invention is described below with reference to the drawings.

[Region Data Editing Apparatus]

An arrangement of a region data editing apparatus 1 according to the present embodiment is described below with reference to FIG. 1 and FIGS. 4 through 6.

Figure 1:
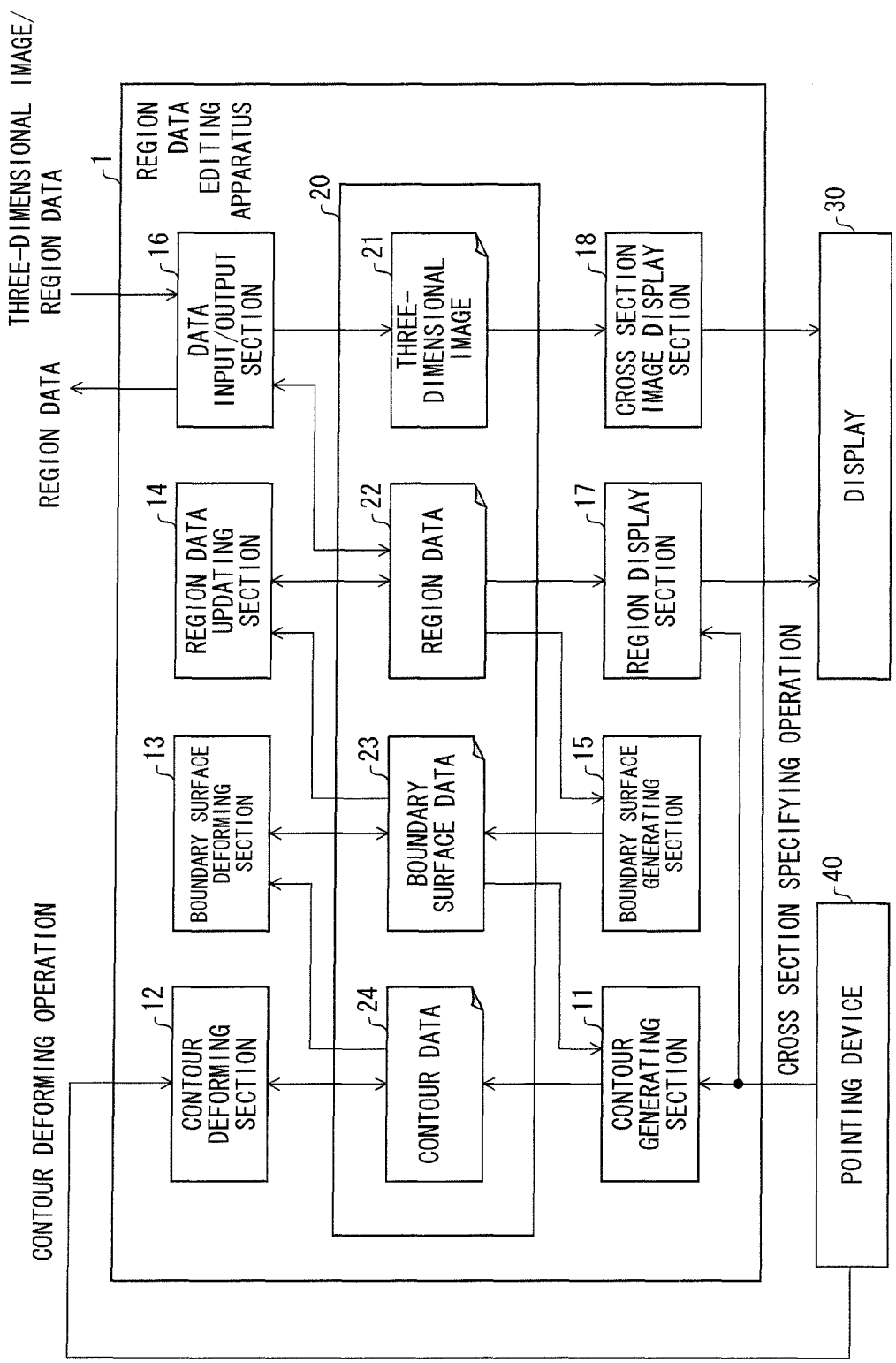
FIG. 1, which shows an embodiment of the present invention, is a block diagram of a region data editing apparatus.

FIG. 1 is a block diagram illustrating an arrangement of a relevant part of the region data editing apparatus 1. The region data editing apparatus 1 includes a contour generating section 11, a contour deforming section 12, a boundary surface deforming section 13, a region data updating section 14, a boundary surface generating section 15, a data input/output section 16, a region display section 17, a cross section image display section 18, and a storage section 20 (see FIG. 1).

A three-dimensional image 21, region data 22, boundary surface data 23, and contour data 24 are stored in the storage section 20. The region data editing apparatus 1, which is directed to edit the region data 22, operates with reference to the three-dimensional image 21, the boundary surface data 23, and the contour data 24. Of these data, the three-dimensional image 21 and the region data 22 are input data for the region data editing apparatus 1 which input data have been obtained from outside by the data input/output section 16.

(Three-Dimensional Image 21, Region Data 22, Boundary surface Data 23, and Contour Data 24)

The three-dimensional image 21 is a set of voxel values assigned to respective voxels which constitute a virtual three-dimensional space (a three-dimensional space). In a case where the virtual three-dimensional space is constituted by I×J×K voxels, i.e., in a case where the three-dimensional image 21 has a resolution of I×J×K voxels, the three-dimensional image 21 can be represented by the three-dimensional array of $\{v(i, j, k) | 0 \leq i < I, 0 \leq j < J, 0 \leq k < K\}$. $v(i, j, k)$ is a voxel value assigned to a voxel $(i, j, k)$. The present embodiment assumes that the three-dimensional image 21 is a three-dimensional image (e.g., a CT image) obtained by capturing an image of a living body (e.g., a human body).

The region data 22 represents a region D of the virtual three-dimensional space. According to the present embodiment, the region D is represented by a voxel group B which is constituted by voxels belonging to the region D. In this case, for example, a set of flags (the three-dimensional array) of $\{f(i, j, k) | 0 \leq i < I, 0 \leq j < J, 0 \leq k < K\}$ which indicates whether or not the voxels which constitute the virtual three-dimensional space belong to the region D can be used as the region data 22.

In a case where a voxel (i, j, k) does not belong to the region D, f (i, j, k) has a value of 0 (zero). In a case where a voxel (i, j, k) belongs to the region D, f (i, j, k) has a value of 1. Note that the region D is a three-dimensional region of a virtual three-dimensional space which three-dimensional region has been specified in accordance with voxel values assigned to respective voxels (i, j, k) and other volume data. The present embodiment assumes that the region D is a region which corresponds to an en bloc tissue (e.g., a bone structure).

The boundary surface data 23 represents a boundary surface ∂ D between inside and outside of the region D. According to the present embodiment, the boundary surface ∂ D is represented by a polygon mesh M which approximates the boundary surface ∂ D. In this case, for example, (i) a set (a two-dimensional array) of three dimensional coordinates of respective vertices Vn of the polygon mesh M and (ii) topology information which specifies a topology of the polygon mesh M can be usable as the boundary surface data 23. According to the present embodiment, the topology information, which can have any data structure, has a publicly-known winged edge data structure. Note that the boundary surface data 23 is generated from the region data 22 by the boundary surface generating section 15. According to the present embodiment, the boundary surface data 23, which can be generated by any method, is generated by a publicly-known Marching Cubes method.

The contour data 24 represents a curved line on the boundary surface ∂ D, especially an intersection line C of the boundary surface ∂ D and a cross section S. The intersection line C is hereinafter referred to as a contour C since the intersection line C corresponds to a contour of the region D on the cross section S. The cross section S is a curved surface or a planar surface which a user can freely set in the virtual three-dimensional space. According to the present embodiment, the contour C is represented by a polyline P whose vertices are intersection points {W0, W1, . . . , WN} of edges of the polygon mesh M and the cross section S. In this case, for example, a set (a two-dimensional array) of three dimensional coordinates of respective vertices Wn of the polyline P is usable as the contour data 24. The contour data 24 is generated by the contour generating section 11 and deformed by the contour deforming section 12. How to generate and deform the contour data 24 is to be described later.

(Region Display Section and Contour Generating Section)

The region display section 17 serves as means for displaying the region D on a display 30 with reference to the region data 22. According to the present embodiment, the region D can be displayed by projecting, on a screen provided in the virtual three-dimensional space, the voxel group B which represents the region D or by carrying out volume rendering with respect to the three-dimensional image 21. Note that the user can freely locate the screen in the virtual three-dimensional space.

The contour generating section 11 serves as means (specifying operation receiving means) for receiving a cross section specifying operation while the region display section 17 is displaying the region D, the cross section specifying operation being an operation in which the cross section S is specified. According to the present embodiment, in response to the cross section specifying operation in which the cross section S is specified, the contour generating section 11 further generates the contour data 24 which represents the contour C of the region D on the cross section S (an intersection line of the cross section S and the boundary surface ∂ D). The contour data 24 generated by the contour generating section 11 is stored in the storage section 20.

According to the present embodiment, the cross section specifying operation received by the contour generating section 11 refers to a line draw operation (a stroke operation) in which a line γ is drawn on the screen by use of a pointing device 40 such as a mouse or a trackpad. The contour generating section 11 regards the line draw operation in which the line γ is drawn on the screen as the cross section specifying operation in which the cross section S=S (γ) is specified such that a projection of the cross section S on the screen coincides with the line γ. Namely, the user uses the line draw operation in which the line γ is drawn on the screen, so as to carry out the cross section specifying operation in which the cross section S is specified. In a case where the line γ is a straight line, the cross section S (γ) is a planar surface. In a case where the line γ is a curved line, the cross section S (γ) is a curved surface.

The contour generating section 11 derives, by, for example, the following STEPs 1 through 5, the polyline P=P (γ) which represents the contour C=C (γ).

Figure 2A:
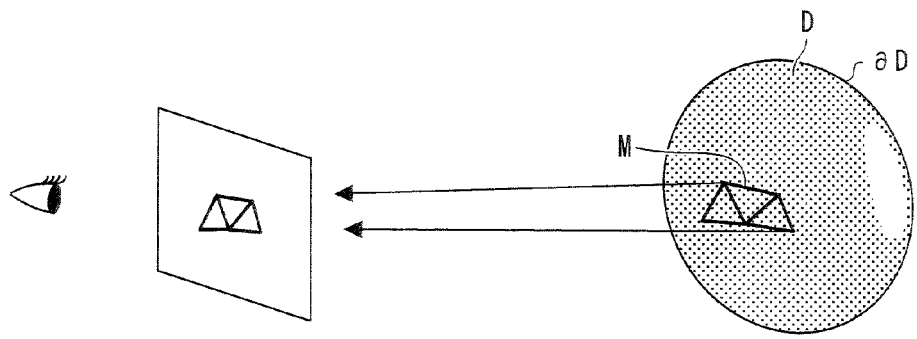
FIG. 2(a), which shows the embodiment of the present invention, illustrates a polygon mesh M which is projected on a screen and represents a boundary surface a ∂ D.
Figure 2B:
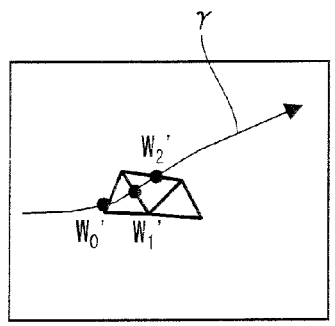
FIG. 2(b), which shows the embodiment of the present invention, illustrates intersection points W0', W1', and W2' of (i) the polygon mesh M which is projected on the screen and represents the boundary surface ∂ D and (ii) a line γ which represents a trajectory of a cursor.
Figure 2C:
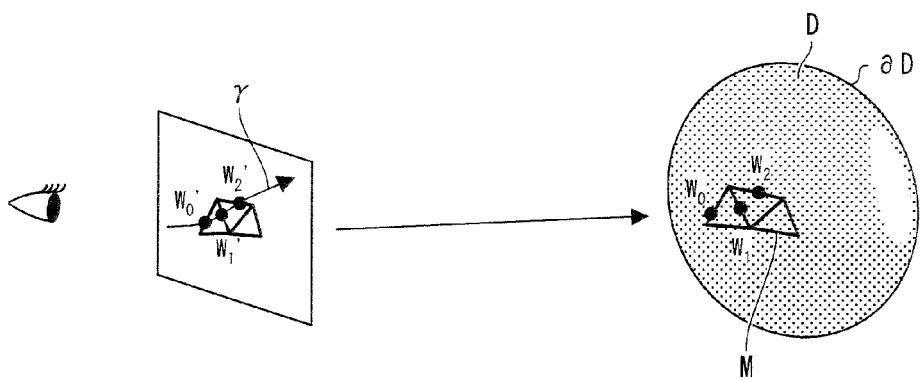
FIG. 2(c), which shows the embodiment of the present invention, illustrates inverse images on the intersection points W0', W1', and W2' of the polygon mesh M which represents the boundary surface ∂ D.

STEP1: The contour generating section 11 projects the edges of the polygon mesh M on the screen (see FIG. 2(a)).
STEP2: The contour generating section 11 detects the line γ which a cursor draws on the screen. STEP3: The contour generating section 11 finds intersection points {W0', W1', W2', . . . } of the line γ detected in STEP2 and images of the respective edges obtained in STEP1 (see FIG. 2(b)). STEP4: The contour generating section 11 finds inverse images Wn of the respective intersection points Wn' found in STEP3. Namely, the contour generating section 11 finds a point Wn whose projection coincides with a corresponding intersection point Wn', the point Wn being located on a corresponding edge of the polygon mesh M (see FIG. 2(c)). STEP: The contour generating section 11 determines how the inverse images {W0, W1, W2, . . . } found in STEP4 are adjacent to each other is determined with reference to the topology information of the polygon mesh M.

The above STEPs 1 through 5 allow obtainment of the polyline P (γ) whose vertices are the inverse images {W0, W1, W2, . . . }. Note that the winged edge data structure is employed as the topology information so that how the inverse images {W0, W1, W2, . . . } are adjacent to each other is easily determined in STEPS.

Figure 4:
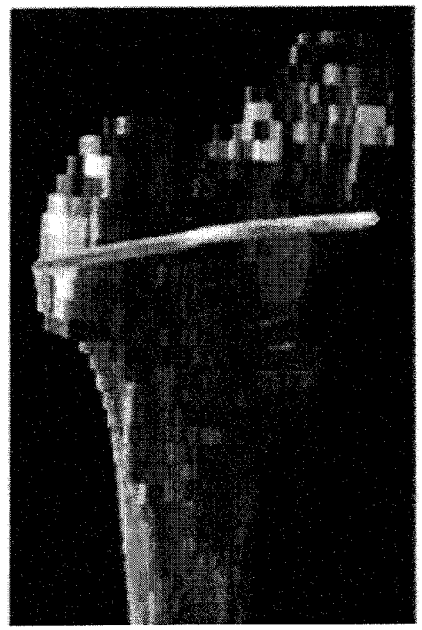
FIG. 4, which shows the embodiment of the present invention, illustrates an example of a picture which is outputted to a display by a region display section of the region data editing apparatus illustrated in FIG. 1.

Note that in response to the cross section specifying operation in which the cross section S is specified, the region display section 17 displays, on the display 30, the contour C of the region D on the cross section S together with the region D. According to the present embodiment, the contour C can be displayed by projecting, on the screen, edges of the polyline P which represents the contour C with reference to the contour data 24. FIG. 4 illustrates a picture which is outputted to the display 30 by the region display section 17 in this case. In the picture illustrated in FIG. 4, the edges of the polyline P are represented not as hairlines but as fibers (cylinders having a given radius), so as to improve visibility.

The present embodiment employs an arrangement such that the line draw operation in which the line γ is drawn on the screen specifies the cross section S=S (γ) such that a projection of the cross section S on the screen coincides with the line γ. Accordingly, the cross section S which can be specified in the present embodiment is limited to a special cross section which meets a requirement under which the projection of the cross section S on the screen coincides with a straight line or a curved line. However, the user can freely locate the screen (and a viewpoint) in the virtual three-dimensional space. Therefore, a simple operation in which a line is drawn on the screen allows specification of a surface which has a great variety. Of course, in a case where the cross section specifying operation is allowed to be complicated, for example, an arrangement such that a freeform curved surface is specified can be employed instead of the arrangement such that such a special curved surface is specified.

(Cross Section Image Display Section and Contour Deforming Section)

Figure 5:
FIG. 5, which shows the embodiment of the present invention, illustrates an example of a picture which is outputted to a display by a cross section image display section of the region data editing apparatus illustrated in FIG. 1.
Figure 6A:
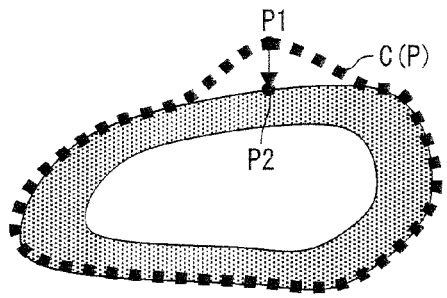
FIG. 6(a), which shows the embodiment of the present invention, illustrates an example of the picture which is outputted to the display by the cross section image display section of the region data editing apparatus illustrated in FIG. 1 before a drag operation is carried out.
Figure 6B:
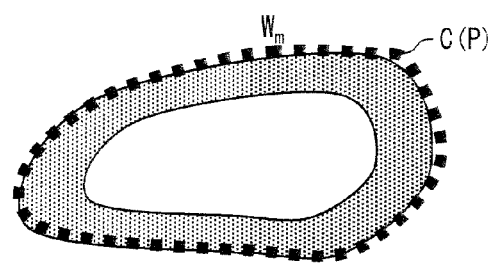
FIG. 6(b), which shows the embodiment of the present invention, illustrates an example of the picture which is outputted to the display by the cross section image display section of the region data editing apparatus illustrated in FIG. 1 after the drag operation is carried out.
Figure 6C:
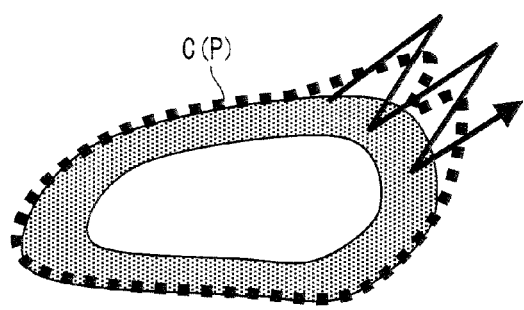
FIG. 6(c), which shows the embodiment of the present invention, illustrates an example of the picture which is outputted to the display by the cross section image display section of the region data editing apparatus illustrated in FIG. 1 before a scrub gesture is carried out.
Figure 6D:
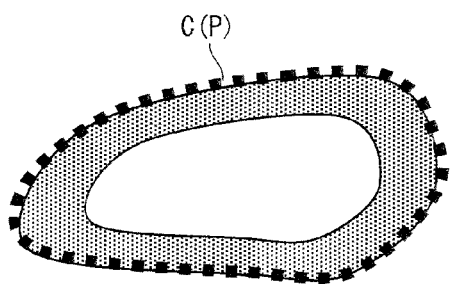
FIG. 6(d), which shows the embodiment of the present invention, illustrates an example of the picture which is outputted to the display by the cross section image display section of the region data editing apparatus illustrated in FIG. 1 before the scrub gesture is carried out.

The cross section image display section 18 serves as means for generating a cross section image I (S) of the three-dimensional image 21, so as to display the cross section image I (S) on the display 30 together with the contour C. Note here that I (S) is a cross section image in the cross section S specified by the cross section specifying operation described earlier. The contour C, which is the intersection line of the boundary surface ∂ D and the cross section S, corresponds to the contour of the region D on the cross section S. The cross section image I (S) can be generated by, for example, extracting, from the three-dimensional image 21, voxel values assigned to the respective voxels which intersect the cross section S. FIG. 5 illustrates a picture which is outputted to the display 30 by the cross section image display section 18 in this case.

The contour deforming section 12 serves as means (deforming operation receiving means) for receiving a contour deforming operation while the cross section image display section 18 is displaying the cross section image I (S), the contour deforming operation being an operation in which the contour C is deformed. According to the present embodiment, in response to the contour deforming operation, the contour deforming section 12 further updates the contour data 24 which represents the contour C (e.g., deforms the polyline P which represents the contour C). Together with the contour data 24 which has not been updated, the contour data 24 updated by the contour deforming section 12 is stored in the storage section 20. Note that update of the contour data 24 by the contour deforming section 12 and update of the contour C displayed by the cross section image display section 18 are carried out simultaneously in response to the contour deforming operation.

According to the present embodiment, a first contour deforming operation received by the contour deforming section 12 is a drag operation in which a vertex Wm of the polyline P which represents the contour C is moved from a point P1 on the cross section image I (S) to a point P2 on the cross section image I (S) by use of the pointing device 40. In response to this drag operation, the contour deforming section 12 updates three-dimensional coordinates of the vertex Wm which has been moved from the point P1 to the point P2 from three-dimensional coordinates of the point P1 to three-dimensional coordinates of the point P2.

FIG. 6(*a*) illustrates a picture which is outputted to the display 30 by the cross section image display section 18 before the drag operation is carried out, and FIG. 6(*b*) illustrates a picture which is outputted to the display 30 by the cross section image display section 18 after the drag operation is carried out. Since the cross section image I (S) is outputted to the display 30 together with the contour C (see FIG. 6(*a*) and FIG. 6(*b*)), the user can deform the contour C while visually inspecting the cross section image I (S). It is also easy to deform the contour C so that the contour C is along a boundary of the region D.

According to the present embodiment, a second contour deforming operation received by the contour deforming section 12 is a scrub gesture for smoothing the polyline P which represents the contour C. The scrub gesture, which is one of widely-used gesture commands, refers to an operation in which the cursor is zigzag moved by use of the pointing device 40 so that the polyline P which represents the contour C is smoothed. In response to this scrub gesture, in order to reduce a curvature of the contour C, the contour deforming section 12 updates three-dimensional coordinates of endpoints (vertices) of the respective edges which the trajectory of the cursor intersects.

FIG. 6(*c*) illustrates a picture which is outputted to the display 30 by the cross section image display section 18 before the scrub gesture is carried out, and FIG. 6(*d*) illustrates a picture which is outputted to the display 30 by the cross section image display section 18 after the scrub gesture is carried out. Since the cross section image I (S) is outputted to the display 30 together with the contour C, the user can easily specify, in the picture illustrated in FIG. 6(*c*), which part of the contour C should be smoothed. Further, the user can easily check, in the picture illustrated in FIG. 6(*d*), whether or not the contour C which has been smoothed is along the boundary of the region D.

(Boundary Surface Deforming Section and Region Data Updating Section)

The boundary surface deforming section 13 serves as means for deforming the boundary surface ∂ D in such a manner that the boundary surface follows the contour C deformed by the contour deforming section 12. According to the present embodiment, in response to the update of the contour data 24 which represents the contour C (e.g., the deformation of the polyline P which represents the contour C), the boundary surface deforming section 13 updates the boundary surface data 23 which represents the boundary surface ∂ D (e.g., deforms the polygon mesh M which represents the boundary surface ∂ D). The boundary surface deforming section 13 can update the boundary surface data 23 by, for example, updating three-dimensional coordinates of a vertex of the polygon mesh M which vertex is in the vicinity of the contour C, so that the following requirements are met.

Requirement 1: An edge em' of a polygon mesh M' after deformation which edge em' corresponds to an edge em of the polygon mesh M before deformation (an edge which has an ID identical to that of a corresponding edge em) includes a vertex Wm' of a polyline P' after deformation which vertex Wm' corresponds to a vertex Wm (a vertex which has an ID identical to that of a corresponding vertex Wm). Namely, the deformation of the polygon mesh M follows the deformation of the polyline P.

Requirement 2: A change in graph Laplacian (a kind of curvature approximation) of the respective vertices is as small as possible between the polygon mesh M before deformation and the polygon mesh M' after deformation. It is desirable that the polygon mesh M' after deformation be a polygon mesh which meets the requirement 1 and in which graph Laplacians of the respective vertices disperse least.

The boundary surface deforming section 13 deforms, by, for example, the following STEPs 1 through 5, the polygon mesh M which represents the boundary surface ∂ D. STEP1: The boundary surface deforming section 13 reads out, from the storage section 20, the contour data 24 which has not been updated and represents the contour C which has not been deformed. STEP2: The boundary surface deforming section 13 reads out, from the storage section 20, the boundary surface data 23 which represents the polygon mesh M. STEP3: The boundary surface deforming section 13 specifies, with reference to the contour data 24 read out in STEP1 and the boundary surface data 23 read out in STEP2, the edge em of the polygon mesh M which em includes the vertex Wm. STEP4: The boundary surface deforming section 13 reads out, from the storage section 20, the contour data 24 which has been updated and represents a contour C' which has been deformed. STEP5: The boundary surface deforming section 13 updates three-dimensional coordinates of a vertex of the polygon mesh M which vertex is in the vicinity of the polyline P, so as to cause the above requirements 1 and 2 to be met.

Figure 7A:
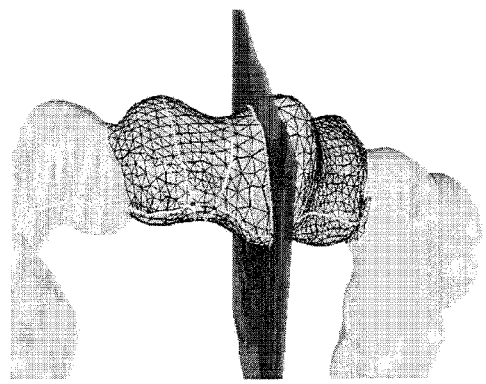
FIG. 7(a), which shows the embodiment of the present invention, illustrates a mesh to be deformed.
Figure 7B:
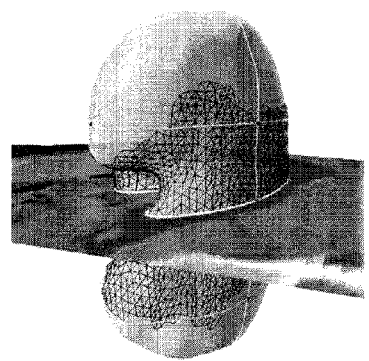
FIG. 7(b), which shows the embodiment of the present invention, illustrates a mesh to be deformed.

Note that, as described earlier, the boundary surface deforming section 13 locally deform the polygon mesh M and not the whole polygon mesh M but a part of the polygon mesh M (the vicinity of the contour C which has been deformed) is to be deformed. FIG. 7(a) and FIG. 7(b) illustrate meshes to be deformed. In each of FIG. 7(a) and FIG. 7(b), only edges which define a mesh to be deformed of the polygon mesh M are represented by hairlines. As described earlier, local deformation of the polygon mesh M can prevent deformation of the polygon mesh M which deformation is not intended by the user from occurring away from the contour C which has been deformed.

Note that the region display section 17 can have a function of outputting the region D to the display 30 with reference to the region data 22 which has been updated. This allows the user to easily grasp how the region data updating section 14 has updated the region data 22.

The region data updating section 14 serves as means for updating the region data 22 so that an inside of the boundary surface ∂ D which has been deformed by the boundary surface deforming section 13 is represented. According to the present embodiment, in response to the update of the boundary surface data 23 which represents the boundary surface ∂ D (the deformation of the polygon mesh M which represents the boundary surface κ D), the region data updating section 14 updates the region data 22 which represents the region D. More specifically, the region data 22 which represents the region D is updated so that the region data 22 represents an interior D' of the polygon mesh M' after deformation. For example, in a case where flags which indicate whether or not the voxels which constitute the virtual three-dimensional space belong to the region D are used as the region data 22, the flags of the respective voxels located inside the polygon mesh M' after deformation are reset to 1 and the flags of the respective voxels located outside the polygon mesh M' after deformation are reset to 0 (zero), so that the boundary surface data 23 can be updated.

[Example of Arrangement of the Region Data Editing Apparatus]

Figure 3:
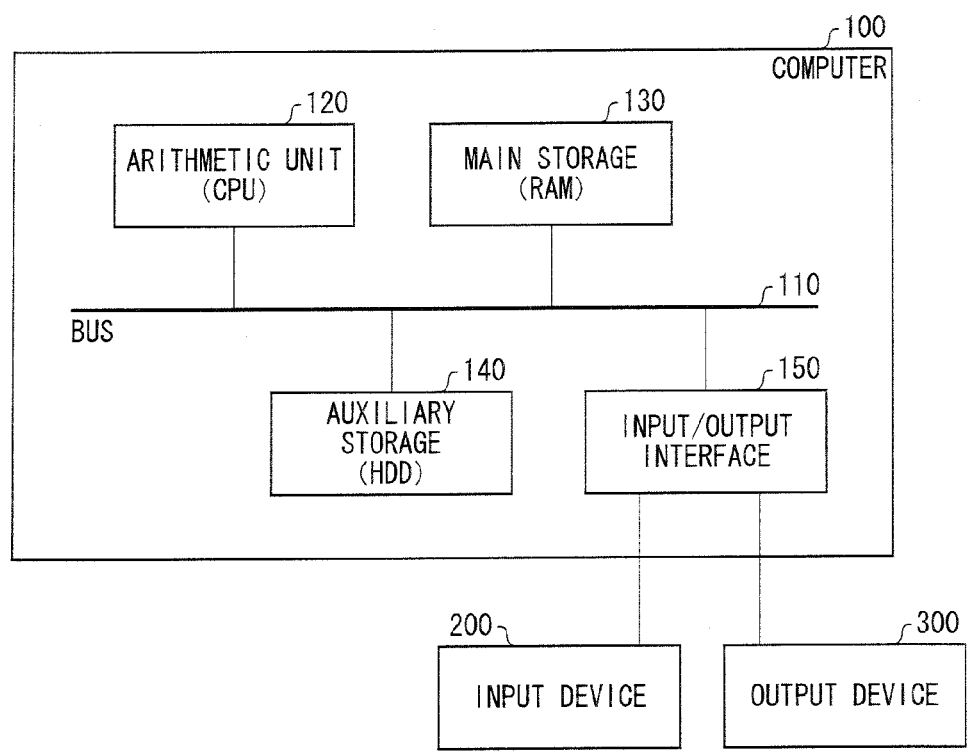
FIG. 3, which shows the embodiment of the present invention, is a block diagram of a computer which functions as the region data editing apparatus illustrated in FIG. 1.

The region data editing apparatus 1 can be realized by use of a computer (an electronic computer). FIG. 3 is a block diagram illustrating an arrangement of a computer 100 which is usable as the region data editing apparatus 1.

The computer 100 includes an arithmetic unit 120, a main storage 130, an auxiliary storage 140, and an input/output interface 150 which are connected to each other via a bus 110 (see FIG. 3). A device which is usable as the arithmetic unit 120 is exemplified by a CPU (Central Processing Unit). A device which is usable as the main storage 130 is exemplified by a semiconductor RAM (random access memory). A device which is usable as the auxiliary storage 140 is exemplified by a hard disk drive.

Each of an input device 200 and an output device 300 is connected to the input/output interface 150 (see FIG. 3).

The input device 200 which is connected to the input/output interface 150 is exemplified by the pointing device 40 (see FIG. 1) by which the cross section specifying operation or the contour deforming operation is carried out. The output device 300 which is connected to the input/output interface 150 is exemplified by the display 30 (see FIG. 1) on which the region D or the cross section image I (S) is displayed.

Various programs for causing the computer 100 to operate as the region data editing apparatus 1 are stored in the auxiliary storage 140. Specifically, a contour generating program, a contour deformation program, a boundary surface deformation program, a boundary surface generating program, a data input/output program, a region display program, and a cross section image display program are stored in the auxiliary storage 140.

The arithmetic unit 120 expands, into the main storage 130, the various programs stored in the auxiliary storage 140 and carries out commands included in the respective various programs which have been expanded into the main storage 130, so as to cause the computer 100 to operate as each of the contour generating section 11, the contour deforming section 12, the boundary surface deforming section 13, the region data updating section 14, the boundary surface generating section 15, the data input/output section 16, the region display section 17, and the cross section image display section 18 (see FIG. 1).

The main storage 130 functions as the storage section 20 (see FIG. 1) in which the three-dimensional image 21, the region data 22, the boundary surface data 23, and the contour data 24 to each of which the arithmetic unit 120 refers are stored. The three-dimensional image 21 and the region data 22 which have been obtained from outside are stored in the main storage 130 for use.

Note that the arrangement is described here such that the computer 100 functions as the region data editing apparatus 1 by use of the various programs recorded in the auxiliary storage 140 which is an internal recording medium. However, the present invention is not limited to this. Namely, an arrangement can be employed such that the computer 100 functions as the region data editing apparatus 1 by use of a program recorded in an external recording medium. Any computer-readable recording medium is usable as the external recording medium. The external recording medium can be realized by: (i) tapes such as a magnetic tape and a cassette tape, (ii) disks including magnetic disks such as a floppy (registered trademark) and a hard disk and optical disks such as a CD-ROM, an MO, an MD, a DVD, and a CD-R, (iii) cards such as an IC card (including a memory card) and an optical card, (iv) semiconductor memories such as a mask ROM, EPROM, EEPROM, a flash ROM, and (v) the like.

Note that the computer 100 can be arranged to be connectable to a communication network so that each of program codes mentioned above is supplied to the computer 100 via the communication network. The communication network is not particularly limited and is exemplified by the Internet, intranet, extranet, LAN, ISDN, VAN, a CATV communication network, a virtual private network, a telephone circuit network, a mobile communication network, a satellite communication network. A transmission medium which constitutes the communication network is not particularly limited and is exemplified by wired transmission media such as IEEE1394, USB, a power-line carrier, a cable TV circuit, a telephone line, and ADSL and wireless transmission media such as infrared systems including IrDA and a remote controller, Bluetooth (registered trademark), 802.11 wireless network, HDR, a mobile phone network, a satellite circuit, and a terrestrial digital network.

Note that instead of the arrangement such that each of the display 30 and the pointing device 40 is connected to the computer 100 via the input/output interface 150, it is possible to employ (1) an arrangement (used for a laptop PC etc.) such that the display 30 and the pointing device 40 are provided in the computer 100 or (2) an arrangement (used for a tablet PC etc.) such that a touch panel display which functions as both the display 30 and the pointing device 40 is provided in the computer 100.

[Region Data Editing Method]

Figure 8:
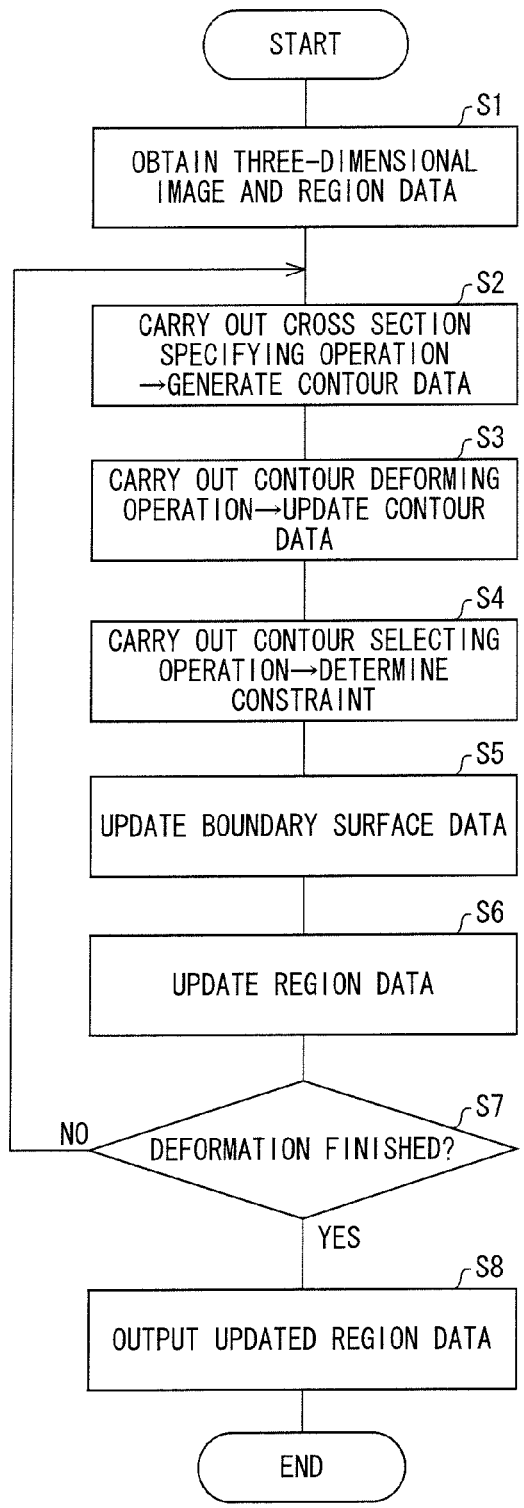
FIG. 8, which shows the embodiment of the present invention, is a flow chart illustrating a flow of a region data editing process carried out by the region data editing apparatus illustrated in FIG. 1.

A flow of a region data editing process carried out by the region data editing apparatus 1 is described below with reference to FIG. 8. FIG. 8 is a flow chart illustrating the flow of the region data editing process carried out by the region data editing apparatus 1. The following description discusses, in order, steps in the region data editing process carried out by the region data editing apparatus 1.

Step S1: The data input/output section 16 obtains the three-dimensional image 21 and the region data 22 from outside, so as to store the three-dimensional image 21 and the region data 22 in the storage section 20. The boundary surface generating section 15 generates the boundary surface data 23 from the region data 22, so as to store the boundary surface data 23 in the storage section 20.

Step S2: The region display section 17 displays, on the display 30, the region D which is represented by the region data 22 stored in the storage section 20, and the contour generating section 11 waits for the cross section specifying operation to be inputted. The region D, which is outputted to the display 30, allows the user to carry out the cross section specifying operation while visually inspecting the region D. In response to the input of the cross section specifying operation, the contour generating section 11 generates the contour data 24 which represents the contour C, so as to cause the contour data 24 to be in accordance with the cross section specifying operation. Then, the contour data 24 generated by the contour generating section 11 is stored in the storage section 20. Note here that the contour C which is in accordance with the cross section specifying operation refers to an intersection line of (i) the cross section S which has been specified by the cross section specifying operation and (ii) the boundary surface ∂ D.

Step S3: The cross section image display section 18 displays, on the display 30, the cross section image I (S) which is in accordance with the cross section specifying operation, and the contour deforming section 12 waits for the contour deforming operation to be inputted. Note here that the cross section image I (S) which is in accordance with the cross section specifying operation refers to a cross section image of the three-dimensional image 21 in the cross section S specified by the cross section specifying. The cross section image I (S), which is outputted to the display 30, allows the user to carry out the contour deforming operation while visually inspecting the cross section image I (S). In response to the input of the contour deforming operation, the contour deforming section 12 updates the contour data 24 stored in the storage section 20, so as to cause the contour data 24 to be in accordance with the contour C' which has been deformed in response to the contour deforming operation. The cross section image display section 18 updates the contour C which is outputted to the display 30 to the contour C' which has been deformed in response to the contour deforming operation.

Step S4: This step is to be described later.

Step S5: The boundary surface deforming section 13 updates the boundary surface data 23 stored in the storage section 20, so that the boundary surface data 23 is in accordance with the contour data 24 which has been updated in Step S3.

Step S6: The region data updating section 14 updates the region data 22 stored in the storage section 20, so that the region data 22 is in accordance with the boundary surface data 23 which has been updated in Step S5. The region display section 17 displays, on the display 30, a region D' which is represented by the region data 22 thus updated.

Step S7: The region data updating section 14 causes a dialogue which requires the user to determine whether or not the region data 22 which has been updated in Step S6 is regarded as final region data to be outputted to the display 30. The user determines, with reference to the region D' outputted to the display 30, whether or not the region data 22 which has been updated in Step S6 is regarded as final region data.

Step S8: In a case where the user determines that the region data 22 which has been updated in Step S6 is regarded as final region data (Step S7: Yes), the data input/output section 16 supplies, to outside, the region data 22 which has been updated in Step S6. In contrast, in a case where the user determines that the region data 22 which has been updated in Step S6 is not regarded as final region data (Step S7: No), the region data editing apparatus 1 repeats Steps S2 through S6.

The region data editing apparatus 1 repeatedly carries out cycles of Steps S2 through S6 (see FIG. 8). This allows the boundary surface data 23 (polygon mesh M) to be updated, in a boundary surface data updating process (in Step S5) in an Ath cycle, with reference to (A-1) contours C1, C2, ..., CA-1 which have been generated in cycles before the Ath cycle and a contour CA generated in the Ath cycle.

It is desirable that the boundary surface deforming section 13 use, as a constraint under which the polygon mesh M is updated in the Ath cycle, the (A-1) contours C1, C2, ..., CA-1 which have been generated in the cycles before the Ath cycle. Namely, it is desirable that the boundary surface deforming section 13 update three-dimensional coordinates of a vertex of the polygon mesh M which vertex is in the vicinity of the contour CA so as to meet the aforementioned requirements (1) and (2) but also satisfy a constraint under which an edge em' of a polygon mesh M' after deformation which edge em' corresponds to an edge em of the polygon mesh M before deformation includes a vertex Wam' of a polyline Pa' after deformation which vertex Wam' corresponds to a vertex Warn of a polyline Pa which represents a contour Ca (a=1, 2, ..., A-1). In a case where such an arrangement is employed, the cycles of the steps illustrated in FIG. 8 are repeatedly carried out, thereby allowing the region D represented by the region data 22 to converge to a desired shape.

However, in a case where the arrangement is employed such that all the contours C1, C2, ..., CA-1 which have been generated in the cycles before the Ath cycle are used as the constraint and at least one inappropriate contour is included in the contours C1, C2, ..., CA-1 which have been generated in the cycles before the Ath cycle, the region D represented by the region data 22 may be prevented from converging to a desired shape. In view of this, it is desirable that the user select which of the contours C1, C2, ..., CA-1 which have been generated in the cycles before the Ath cycle to use as the constraint.

Step S4 in the flow chart of FIG. 8 is directed to cause the user to carry out this selection. Namely, the boundary surface deforming section 13 receives an input of a contour selecting operation, so as to determine, in accordance with the inputted contour selecting operation, whether or not to use each of contours Ca as the constraint (a=1, 2, ..., A-1). According to this, the region D represented by the region data 22 is allowed to converge to a desired shape even if an inappropriate contour is included in the contours C1, C2, ..., CA-1 which have been generated in the cycles before the Ath cycle.

Note that it is possible to employ an arrangement such that the contours C1, C2, ... CA-1 which have been generated in the cycles before the Ath cycle are allowed to be deformed instead of the arrangement such that the user selects which of the contours C1, C2, ..., CA-1 which have been generated in the cycles before the Ath cycle to use as the constraint. For example, a deforming operation in which the contours C1, C2, ..., CA-1 which have been generated in the cycles before the Ath cycle are deformed can be received in Step S2 in which the region D is outputted to the display 30. In this case, Step S4 in the flow chart of FIG. 8 can be replaced with a step in which the user determines whether or not the contour CA generated/deformed in the Ath cycle is deformable (is to be locked).

[Effect Yielded by the Region Data Editing Apparatus]

Figure 9A:
FIG. 9(a), which shows the embodiment of the present invention, illustrates a femoral head region which has been automatically extracted from a CT image and has not been edited.
Figure 9B:
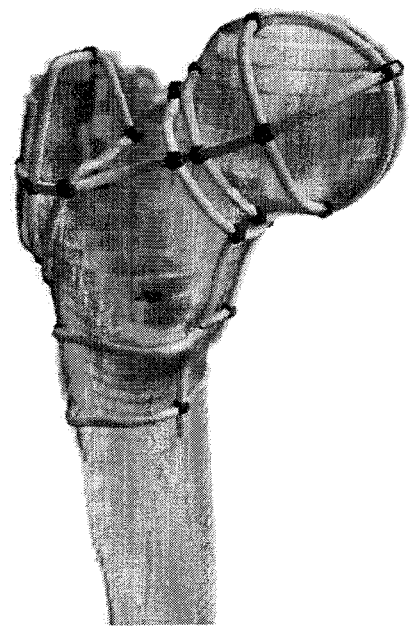
FIG. 9(b), which shows the embodiment of the present invention, illustrates the femoral head region which has been edited by use of the region data editing apparatus illustrated in FIG. 1.

Finally, an effect yielded by the region data editing apparatus 1 according to the present embodiment is described below with reference to FIG. 9. FIG. 9(a) illustrates a femoral head region which has been automatically extracted from a CT image and has not been edited, and FIG. 9(b) illustrates the femoral head region which has been edited by use of the region data editing apparatus according to the present embodiment.

Since a cancellous bone of the femoral head region is covered with an extremely thin cortical bone, it is impossible to accurately reproduce a shape of the femoral head region which has been automatically extracted (see FIG. 9(a)). In contrast, in a case where the region data editing apparatus 1 according to the present embodiment is used, it is possible to accurately reproduce the shape of the femoral head region only by editing 7 to 8 contours (see FIG. 9(b)). The user who is familiar with such operation requires approximately 15 minutes to carry out the operation.

In order to secure, by use of a conventional method, reproducibility which is comparable with that of the present invention, it is generally necessary to carry out a contour correction with respect to approximately 30 to 40 slices (two-dimensional planar cross sections). Namely, it is possible to much more efficiently correct automatically extracted region data than before by use of the region data editing apparatus 1 according to the present embodiment.

[Summary]

As described earlier, an region data editing apparatus according to the present embodiment in which region data editing apparatus region data which represents a region of a virtual three-dimensional space which region has been extracted from a three-dimensional image is edited, the region data editing apparatus includes: an operation receiving section for receiving a cross section specifying operation in which a cross section of the three-dimensional image is specified; a contour deforming section for receiving a contour deforming operation in which a contour of the region on the cross section which has been specified by the cross section specifying operation is deformed; a boundary surface deforming section for deforming a boundary surface between inside and outside of the region in such a manner that the boundary surface follows the contour deformed by the contour deforming section; and a region data updating section for updating the region data in such a manner that the region data thus updated represents an inside of the boundary surface which has been deformed by the boundary surface deforming section.

According to the arrangement, in response to the contour deforming operation carried out by a user with respect to the contour on the specified cross section, the region data editing apparatus deforms the boundary surface between inside and outside of the region in such a manner that the boundary surface follows the deformed contour. Namely, in response to the contour deforming operation carried out by a user with respect to the contour on the specified cross section, the region data editing apparatus deforms a contour of another cross section. This allows the user to deform fewer contours so as to obtain a desired extraction accuracy. Namely, it is possible to efficiently edit the region data so as to prevent a decrease in extraction accuracy.

The region data editing apparatus according to the present embodiment is desirably arranged such that the cross section is a curved surface.

According to the arrangement, in order to more efficiently correct even a region which has a complicated shape it is possible to set a cross section in which a contour is deformed.

The region data editing apparatus according to the present embodiment is desirably arranged such that the cross section is such that a projection of the cross section on a screen is a curved line.

According to the arrangement, it is possible to specify variously shaped cross sections simply by specifying the curved line on the screen.

The region data editing apparatus according to the present embodiment is preferably arranged such that the contour deforming section displays, on a display, (i) a cross section image of the three-dimensional image in the cross section which has been specified by the cross section specifying operation and (ii) the contour.

According to the arrangement, it is possible to correct the contour on the cross section while visually inspecting the cross section image outputted to the display. This makes it possible to more accurately and more easily correct the contour.

The region data editing apparatus according to the present embodiment is preferably arranged such that the contour deforming section receives a first contour deforming operation in which points on the contour are moved and a second contour deforming operation in which the contour is smoothed.

According to the arrangement, it is possible simply and easily deform the contour so that the contour has a desired shape.

The region data editing apparatus according to the present embodiment is preferably arranged such that the boundary surface deforming section locally carries out the deformation with respect to a part of the boundary surface which part has the contour.

According to the arrangement, it is possible to prevent deformation of the boundary which deformation is not intended by the user from occurring away from the contour which has been deformed.

The region data editing apparatus according to the present embodiment is preferably arranged such that: the three-dimensional image is obtained by capturing an image of a living body; and the region corresponds to an en bloc tissue in the three-dimensional image.

According to the arrangement, it is possible to approximate, with high accuracy, a shape of an en bloc tissue such as an organ or a bone structure.

An region data editing method according to the present embodiment in which region data editing method region data which represents a region of a virtual three-dimensional space which region has been extracted from a three-dimensional image is edited, the region data editing method includes the steps of: (a) receiving a cross section specifying operation in which a cross section of the three-dimensional image is specified; (b) receiving a contour deforming operation in which a contour of the region on the cross section which has been specified by the cross section specifying operation is deformed; (c) deforming a boundary surface between inside and outside of the region in such a manner that the boundary surface follows the contour deformed in the step (b); and (d) updating the region data in such a manner that the region data thus updated represents an inside of the boundary surface which has been deformed in the step (c).

The arrangement yields an effect similar to that yielded by the region data editing apparatus.

The region data editing method according to the present embodiment is preferably arranged such that: cycles of the steps (a) through (e) are repeatedly carried out; and in the step (d), contours generated in cycles before a current cycle are used as a constraint, under which the boundary surface is deformed so as to follow how a contour is generated in the current cycle.

According to the arrangement, the cycles are repeatedly carried out, thereby allowing the region represented by the region data to converge to a desired shape.

Note that a program for causing a computer to function as the region data editing apparatus and a computer-readable recording medium in which the program is recorded are both encompassed in the scope of the present embodiment.

[Additional Description]

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably usable for a region specification (a region extraction) in a three-dimensional image. In particular, the present invention is suitably usable for a region specification in a medical image such as a CT (computed tomography) image.

REFERENCE SIGNS LIST

1 Region data editing apparatus
11 Contour generating section (Specifying operation receiving section)
12 Contour deforming section (Deforming operation receiving section)
13 Boundary surface deforming section
14 Region data updating section
15 Boundary surface generating section
16 Data input/output section
17 Region display section
18 Cross section image display section
20 Storage section
21 Three-dimensional image
22 Region data
23 Boundary surface data
24 Contour data

The invention claimed is:

1. A region data editing apparatus comprising:
a data obtaining section for obtaining region data which represents a region of a three-dimensional space which region has been extracted from a three-dimensional image;
a specifying operation receiving section for receiving a cross section specifying operation in which a cross section of the three-dimensional image is specified;
a deforming operation receiving section for receiving a contour deforming operation in which a contour of the region on the cross section which has been specified by the cross section specifying operation is deformed;
a boundary surface deforming section for deforming a boundary surface between inside and outside of the region in such a manner that the boundary surface follows the contour deformed by the contour deforming operation; and
a region data updating section for updating the region data in such a manner that the region data thus updated represents an inside of the boundary surface which has been deformed by the boundary surface deforming section;
wherein the three-dimensional image is obtained by capturing an image of a living body; and
wherein the region corresponds to an organ or a bone structure tissue in the three-dimensional image.

2. The region data editing apparatus as set forth in claim 1, wherein the cross section is a curved surface.

3. The region data editing apparatus as set forth in claim 1, wherein the cross section is such that a projection of the cross section on a screen is a straight line or a curved line.

4. The region data editing apparatus as set forth in claim 1, further comprising:
a cross section image display section for outputting, to a display, (i) a cross section image of the three-dimensional image in the cross section which has been specified by the cross section specifying operation and (ii) the contour.

5. The region data editing apparatus as set forth in claim 1, wherein the deforming operation receiving section receives a first contour deforming operation in which points on the contour are moved and a second contour deforming operation in which the contour is smoothed.

6. The region data editing apparatus as set forth in claim 1, wherein the boundary surface deforming section locally carries out the deformation with respect to a part of the boundary surface which part has the contour.

7. The region data editing apparatus as set forth in claim 1, further comprising:
a region display section for outputting the region to the display in accordance with the region data updated by the region data updating section.

8. A computer-readable non-transitory recording medium in which a program is recorded for causing a computer to operate as a region data editing apparatus recited in claim 1, the program causing the computer to function as each section of the region data editing apparatus.

9. A region data editing method comprising the steps of:
(a) obtaining region data which represents a region of a three-dimensional space which region has been extracted from a three-dimensional image;
(b) receiving a cross section specifying operation in which a cross section of the three-dimensional image is specified;
(c) receiving a contour deforming operation in which a contour of the region on the cross section which has been specified by the cross section specifying operation is deformed;
(d) deforming a boundary surface between inside and outside of the region in such a manner that the boundary surface follows the contour deformed by the contour deforming operation; and
(e) updating the region data in such a manner that the region data thus updated represents an inside of the boundary surface which has been deformed in the step (d);
wherein the three-dimensional image is obtained by capturing an image of a living body; and
wherein the region corresponds to an organ or a bone structure tissue in the three-dimensional image.

10. The region data editing method as set forth in claim 9, wherein:

cycles of the steps (a) through (e) are repeatedly carried out; and in the step (d), contours generated in cycles before a current cycle are used as a constraint, under which the boundary surface is deformed so as to follow how a contour is generated in the current cycle.

* * * * *